(12) United States Patent
Kishi

(10) Patent No.: US 8,110,317 B2
(45) Date of Patent: Feb. 7, 2012

(54) POLYELECTROLYTE, MEMBRANE ELECTRODE ASSEMBLY, FUEL CELL, AND METHOD FOR PRODUCING POLYELECTROLYTE

(75) Inventor: Katsuyuki Kishi, Tokyo (JP)

(73) Assignee: Toppan Printing Co., Ltd. (JP)

( * ) Notice: Subject to any disclaimer, the term of this patent is extended or adjusted under 35 U.S.C. 154(b) by 442 days.

(21) Appl. No.: 12/408,640

(22) Filed: Mar. 20, 2009

(65) Prior Publication Data

US 2009/0239124 A1 Sep. 24, 2009

(30) Foreign Application Priority Data

Mar. 24, 2008 (JP) ................................. 2008-076431

(51) Int. Cl.
*H01M 8/10* (2006.01)
(52) U.S. Cl. ......... 429/493; 429/479; 429/491; 429/492
(58) Field of Classification Search .................... 521/25, 521/27; 429/479, 491, 492, 493, 494
See application file for complete search history.

(56) References Cited

U.S. PATENT DOCUMENTS

2009/0075147 A1 * 3/2009 Kitamura et al. ............... 429/33

FOREIGN PATENT DOCUMENTS

| JP | 2000223135 A | * | 8/2000 |
| JP | 2006-269357 | | 10/2006 |
| JP | 2007-066882 | | 3/2007 |
| WO | WO 2006132207 A1 | * | 12/2006 |

* cited by examiner

*Primary Examiner* — Jerry Lorengo
*Assistant Examiner* — Carlos Barcena
(74) *Attorney, Agent, or Firm* — Squire, Sanders & Dempsey (US) LLP

(57) ABSTRACT

The present invention readily provides an electrolyte which is capable of suppressing elution of a radical-quenching material from the electrolyte and has high proton conductivity and excellent durability.

The polyelectrolyte is obtainable by chemically bonding a proton-conducting polymer having protonic acid groups to a radical-quenching material having a radical-scavenging capability via moieties other than the protonic acid groups by heating at a temperature of 60° C. or more and 250° C. or less. The proton-conducting polymer is an aromatic polymer, polyether ketone or a polyether ether ketone, or phenol resin, has a sulfonic acid group, and has a hydrogen ion exchange capacity of 0.5 meq/g or more and 10 meq/g or less. The radical-quenching material has at least one methylol group in the molecule.

18 Claims, 2 Drawing Sheets

POLYELECTROLYTE, MEMBRANE ELECTRODE ASSEMBLY, FUEL CELL, AND METHOD FOR PRODUCING POLYELECTROLYTE

CROSS REFERENCE TO RELATED APPLICATION

This application is based on and claims the benefit of priority from the Japanese Patent Application number 2008-076431, filed on Mar. 24, 2008, the entire contents of which are incorporated herein by reference.

BACKGROUND OF THE INVENTION

1. Field of the Invention

The present invention relates to a polyelectrolyte, a membrane electrode assembly, a fuel cell, and a method for producing a polyelectrolyte. The invention especially relates to a polyelectrolyte, a membrane electrode assembly, a fuel cell, and a method for producing a polyelectrolyte for polymer electrolyte fuel cells.

The invention is applicable to polymer electrolyte fuel cells for use in electric vehicles, cellular phones, vending machines, underwater robots, submarines, spacecrafts, underwater vehicles, power supplies for underwater bases, etc.

2. Description of the Related Art

In recent years, fuel cells have received attention as an effective solution of environmental problems and energy problems. A fuel cell oxidizes hydrogen or a like fuel using oxygen or a like oxidizer, and converts the thus-generated chemical energy into electrical energy.

According to the kind of electrolyte, fuel cells are classified into an alkali type, a phosphoric acid type, a polymer electrolyte type, a fused carbonate type, a solid oxide type, etc. Polymer electrolyte fuel cells (PEFC) are designed for low-temperature operation with high power density, and thus can be reduced in size and weight. For this reason, they are expected to be applied to portable power supplies, household power supplies, and in-car power sources.

Perfluoro electrolytes, such as practically stable Nafion (registered trademark), and various hydrocarbon electrolytes are used as electrolytes for polymer electrolyte fuel cells (PEFC). However, although these electrolytes have high proton conductivity, there is a problem that the cost therefor is high.

In order to solve the above problem, use of inexpensive hydrocarbon electrolytes has been considered. However, although these electrolytes have high proton conductivity, there is a problem that they lack practical stability (durability).

In order to solve this problem, improvement of durability by complexation of an electrolyte and a radical-quenching material (antioxidant) has been considered (see JP-A-2006-269357 and JP-A-2007-66882).

However, when a radical-quenching material is simply added to an electrolyte, the radical-quenching material is eluted out of the electrolyte during operation of the fuel cell, and consequently the radical-quenching material does not work sufficiently. For the purpose of preventing the elution, addition of a high-molecular-weight radical-quenching material has also been considered. However, because of its high molecular weight, highly dispersion thereof in an electrolyte is impossible. Accordingly, also in this case, the radical-quenching material does not work sufficiently.

SUMMARY OF THE INVENTION

The present invention is aimed to readily provide an electrolyte which is capable of suppressing elution of a radical-quenching material from the electrolyte and has high proton conductivity and excellent durability.

The present inventor conducted intensive research, and as a result he found that when a proton-conducting polymer is chemically bonded to a radical-quenching material having a radical-scavenging capability via moieties other than protonic acid groups, an electrolyte which is capable of suppressing elution of a radical-quenching material from the electrolyte and has high proton conductivity and excellent durability can be provided. The invention was thus accomplished.

A first aspect of the invention is directed to a polyelectrolyte obtainable by chemically bonding a proton-conducting polymer having protonic acid groups to a radical-quenching material having a radical-scavenging capability via moieties other than the protonic acid groups.

A second aspect of the invention is directed to a polyelectrolyte according to the first aspect, wherein the proton-conducting polymer is an aromatic polymer.

A third aspect of the invention is directed to a polyelectrolyte according to the first aspect, wherein the proton-conducting polymer is polyether ketone or polyether ether ketone.

A fourth aspect of the invention is directed to a polyelectrolyte according to the first aspect, wherein the proton-conducting polymer is phenol resin.

A fifth aspect of the invention is directed to a polyelectrolyte according to the first aspect, wherein the proton-conducting polymer has sulfonic acid groups.

A sixth aspect of the invention is directed to a polyelectrolyte according to the first aspect, wherein the proton-conducting polymer has a hydrogen ion exchange capacity of 0.5 meq/g or more and 10 meq/g or less.

A seventh aspect of the invention is directed to a polyelectrolyte according to the first aspect, wherein the radical-quenching material has at least one methylol group in the molecule.

An eighth aspect of the invention is directed to a polyelectrolyte according to the first aspect, wherein the chemical bond between the proton-conducting polymer and the radical-quenching material is formed by heating.

A ninth aspect of the invention is directed to a polyelectrolyte according to the first aspect, wherein the heating is performed at a temperature of 60° C. or more and 250° C. or less.

A tenth aspect of the invention is directed to a polyelectrolyte represented by the following chemical formula:

[Chemical Formula 1]

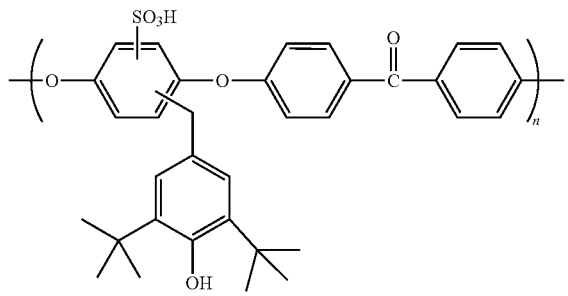

An eleventh aspect of the invention is directed to a membrane electrode assembly comprising the polyelectrolyte of the first aspect.

A twelfth aspect of the invention is directed to a fuel cell comprising the polyelectrolyte of the first aspect.

A thirteenth aspect of the invention is directed to a method for producing a polyelectrolyte, comprising preparing a proton-conducting polymer having protonic acid groups, and chemically bonding the proton-conducting polymer to a radical-quenching material having a radical-scavenging capability via moieties other than the protonic acid groups.

A fourteenth aspect of the invention is directed to a method for producing a polyelectrolyte according to the thirteenth aspect, wherein the proton-conducting polymer is an aromatic polymer.

A fifteenth aspect of the invention is directed to a method for producing a polyelectrolyte according to the thirteenth aspect, wherein the proton-conducting polymer is polyether ketone or polyether ether ketone.

A sixteenth aspect of the invention is directed to a method for producing a polyelectrolyte according to the thirteenth aspect, wherein the proton-conducting polymer is phenol resin.

A seventeenth aspect of the invention is directed to a method for producing a polyelectrolyte according to the thirteenth aspect, wherein the proton-conducting polymer has a hydrogen ion exchange capacity of 0.5 meq/g or more and 10 meq/g or less.

An eighteenth aspect of the invention is directed to a method for producing a polyelectrolyte according to the thirteenth aspect, wherein the proton-conducting polymer has the following chemical formula:

[Chemical Formula 2]

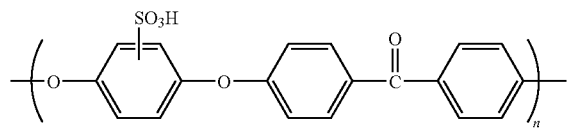

A nineteenth aspect of the invention is directed to a method for producing a polyelectrolyte according to the thirteenth aspect, wherein the radical-quenching material has at least one methylol group in the molecule.

A twentieth aspect of the invention is directed to a method for producing a polyelectrolyte according to the thirteenth aspect, wherein the radical-quenching material is represented by the following formula:

[Chemical Formula 3]

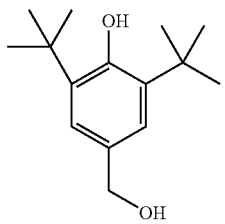

The present invention can readily provide an electrolyte which is capable of suppressing elution of a radical-quenching material from the electrolyte and has high proton conductivity and excellent durability.

DETAILED DESCRIPTION OF THE INVENTION

Figure 1:
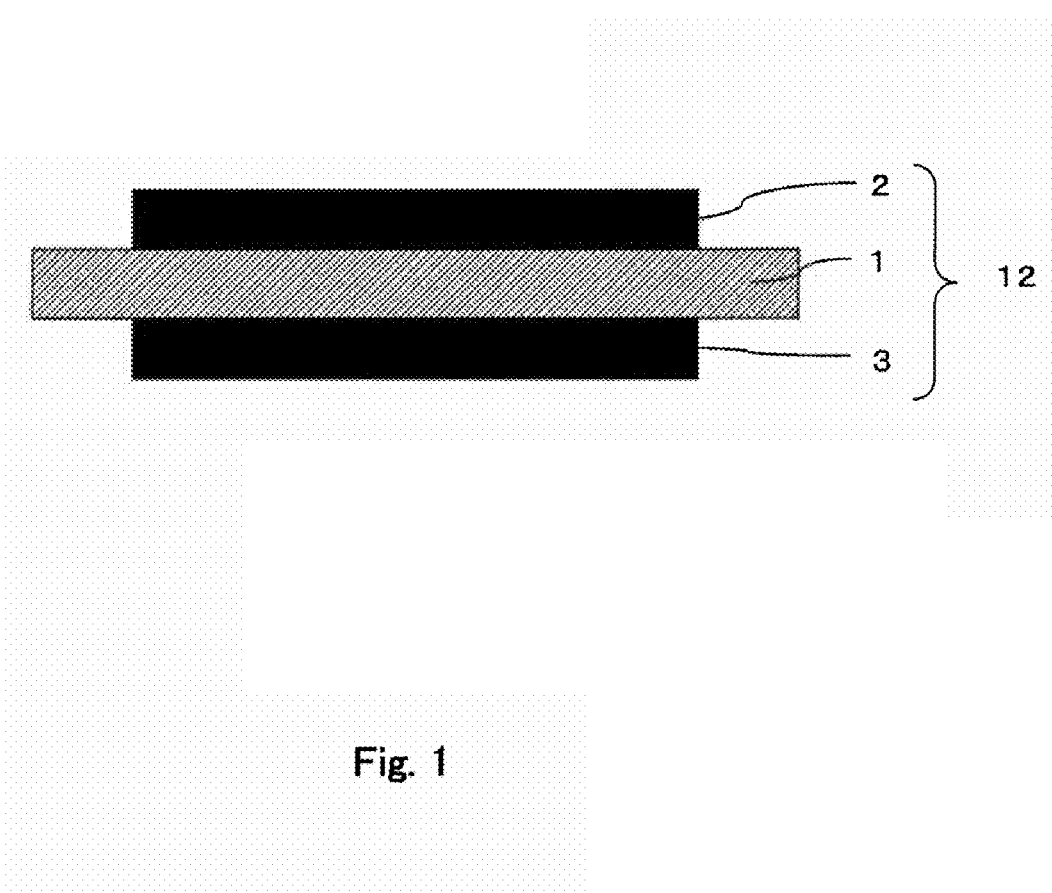
FIG. 1 is a schematic sectional view of a membrane electrode assembly according to one embodiment of the invention.

Hereafter, embodiments of the invention is described in detail with reference to the drawings. In the embodiments, the same components are indicated with the same reference numeral, and explanations which overlap between embodiments are omitted.

A polyelectrolyte 1 according to an embodiment of the invention can be obtained by chemically bonding a proton-conducting polymer having protonic acid groups to a radical-quenching material having a radical-scavenging capability via moieties other than the protonic acid groups. An example of the thus-obtained polyelectrolyte 1 is shown below.

[Chemical Formula 4]

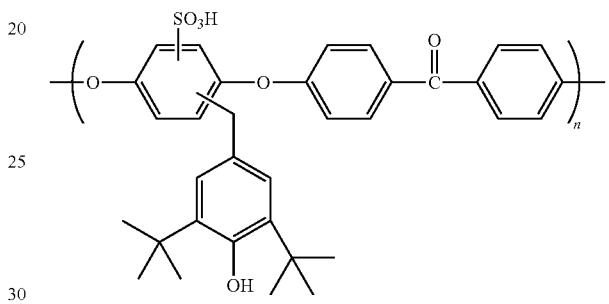

The polyelectrolyte 1 can be obtained by mixing proton-conducting polyether ether ketone having sulfonic acid groups with, as a radical-quenching material having a methylol group, 2,6-di-tert-butyl-4-hydroxymethyl phenol, and then heating the mixture to promote reaction. The structure is such that the aromatic ring moieties in the multimolecular proton-conducting polyether ether ketone, except for the sulfonic acid groups, are bonded via 2,6-di-tert-butyl-4-hydroxymethylphenol residues.

In the polyelectrolyte 1 according to the embodiment of the invention, a radical-quenching material is bonded via moieties other than protonic acid groups. Accordingly, elution of the radical-quenching material from the polymer can be suppressed, and a polyelectrolyte 1 maintaining proton conductivity and having excellent durability can be obtained.

In the polyelectrolyte 1 according to the embodiment of the invention, the chemical bond between the proton-conducting polymer and the radical-quenching material is formed by heating. Because heating allows the reaction to proceed easily, apparatuses and processes can be simplified. Accordingly, the reaction can be performed not only easily but also more economically.

The temperature for chemical bonding is preferably 60° C. or more and 250° C. or less in order to suppress decomposition reaction or elimination of protonic acid groups contained in the proton-conducting polymer and allow the reaction to proceed easily. A temperature out of the range of 60° C. or more and 250° C. or less reduces the durability of the polyelectrolyte 1.

An example of a proton-conducting polymer used for the synthesis of the polyelectrolyte 1 is shown below.

[Chemical Formula 5]

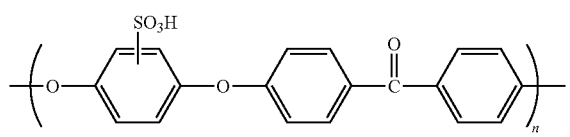

Specific examples of polymers that serve as substrates for the proton-conducting polymer having protonic acid groups according to the embodiment of the invention include epoxy resin, urea resin, propylene resin, phenol resin, xylene resin, melamine resin, polyester resin, alkyd resin, vinylidene resin, furan resin, urethane resin, phenylene ether resin, polycarbonate resin, acrylate resin, amide resin, imide resin, vinyl resin, carboxylic resin, nylon resin, styrol resin, silicone resin, fluororesin, organic or inorganic hybrid polymers, etc. Among the substrate polymers, considering the reactivity with a radical-quenching material, preferable examples are resins containing, in the main chain, an aromatic ring having a site of high electron density where reactivity with a radical-quenching material is high.

Specific examples of the resins having an aromatic ring in the main chain include aromatic polyether, aromatic polyether ketone, aromatic polyether ether ketone, aromatic polyether sulfone, aromatic polysulfone, aromatic polyether nitrile, aromatic polyetherpyridine, aromatic polyimide, aromatic polyamide, aromatic polyamide imide, aromatic polyazole, aromatic polyester, aromatic polycarbonate, etc.

Among polymers having an aromatic ring in the main chain, aromatic polyether ketone and aromatic polyether ether ketone are highly reactive with a crosslinking agent according to the embodiment of the invention, and thus are preferably used. Copolymers or derivatives of these polymers may also be used. They may also be used singly or in combination of two or more kinds.

When the proton-conducting polymer is polyether ketone or polyether ether ketone, the resulting polyelectrolyte 1 is highly reactive with a radical-quenching material and has high proton conductivity.

The protonic acid group of a proton-conducting polymer is not limited, and may be —$SO_3H$, —COOH, —$PO(OH)_2$, —PO(OH), or the like. Among these, —$SO_3H$ (sulfonic acid group) is especially preferable considering the large dissociation constant, stability in water, etc.

The sulfonation and reaction of polyether ether ketone is an electrophilic reaction. Polyether ether ketone thus reacts with an aromatic ring with high electron density located between ether bonds.

The proton-conducting polymer having proton conductivity according to the embodiment of the invention preferably has a hydrogen ion exchange capacity of 0.5 meq/g or more and 10 meq/g or less in order to achieve high proton conductivity and reduce the internal resistance of a fuel cell to thereby obtain high power density. A hydrogen ion exchange capacity of less than 0.5 meq/g leads to insufficient proton conductivity, and results in high internal resistance upon application to a fuel cell, which reduces the power density, while a capacity of more than 10 meq/g reduces water resistance.

Among substrate polymers, phenol resin has an aromatic ring in the main chain, is highly reactive with the radical quenching material according to the embodiment of the invention, and thus is extremely suitable as a substrate polymer.

Phenol resin is used as a proton-conducting polymer of the polyelectrolyte 1 according to the embodiment of the invention. Because phenol resin has an aromatic ring in the main chain, high reactivity with a radical-quenching material and high proton conductivity can be achieved.

An example of a radical-quenching material used for the synthesis of the polyelectrolyte 1 is shown below.

[Chemical Formula 6]

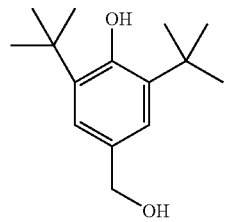

The radical-quenching material according to the embodiment of the invention is not limited, insofar as it is capable of promoting the reaction at, without involving proton acids of a proton-conducting polymer, moieties other than the protonic acid groups, and does not change the proton conductivity of the proton-conducting material before and after the reaction. A radical-quenching material having a structure in which a methylol group represented by —$CH_2OH$ is bonded to an aromatic ring is especially preferable, because the reaction with a proton-conducting material easily proceeds by heating, thereby forming a chemical bond.

As a radical-quenching material having a methylol group according to the embodiment of the invention, a compound having one or more methylol-group-containing aromatic rings in the molecule is preferably used, because the reaction proceeds without involving protonic acid groups contained in the proton-conducting polymer, and thus the proton conductivity is not impaired by the reaction, and also because the reaction easily proceeds by heating. Further, when a radical-quenching material having a plurality of methylol groups in the molecule is used, the proton-conducting polymer can be crosslinked. In other words, when a radical-quenching material having a plurality of methylol groups in the molecule is used, such a material serves not only as a radical-quenching material but also as a crosslinking agent in forming the polyelectrolyte.

The method for reaction may be optical irradiation, heating, pH control, etc. The proton-conducting polymer solution used in the embodiment of the invention is acidic, and thus a pH control method wherein reaction takes place under acidic conditions is preferable.

The radical-quenching material used in the invention is a material having a moiety with a radical-scavenging capability.

The moiety with a radical-scavenging capability means a functional group used in antioxidants. Examples thereof include the phenolic hydroxy group of phenolic compounds, amine of amine compounds, thiol group of sulfur compounds, phosphite group of phosphorus compounds, etc., but are not limited thereto in the embodiment of the invention.

When a proton-conducting polymer and a radical-quenching material having a radical-scavenging capability are chemically bonded via moieties other than protonic acid groups, elution of the radical-quenching material from the electrolyte can be suppressed. Further, because a low-molecular radical-quenching material can be used, high dispersion of a radical-quenching material in the electrolyte is possible. Accordingly, the advantage of the added radical-quenching material is sufficiently provided.

Further, because the chemical bond between the proton-conducting polymer and the radical-quenching material is formed by heating, a polyelectrolyte 1 having excellent durability can be readily obtained.

As shown in FIG. 1, a membrane electrode assembly (MEA) 12 according to the embodiment of the invention comprises a polyelectrolyte 1, an air-electrode-side electrode catalyst layer 2, and a fuel-electrode-side electrode catalyst layer 3. The air-electrode-side electrode catalyst layer 2 and the fuel-electrode-side catalyst layer 3 are bonded to and laminated on one side and the other side of the polyelectrolyte 1, respectively, to form the membrane electrode assembly 12. The air-electrode-side electrode catalyst layer 2 and the fuel-electrode-side catalyst layer 3 each contain a reaction catalyst supported by carbon black particles that serve as an electric conductor, and are formed from a proton-conducting polymer or from the polyelectrolyte 1 obtained by reacting a proton-conducting polymer with a radical-quenching material to form a chemical bond via moieties other than protonic acid groups of the proton-conducting polymer.

Examples of reaction catalysts usable for the air-electrode-side electrode catalyst layer 2 and the fuel-electrode-side catalyst layer 3 according to the embodiment of the invention include platinum, palladium, ruthenium, iridium, rhodium, osmium, and like platinum group elements, iron, lead, copper, chromium, cobalt, nickel, manganese, vanadium, molybdenum, gallium, aluminum, and like metals, alloys, oxide, and double oxides thereof, etc. These catalysts preferably have a particle diameter of 0.5 nm or more and 20 nm or less, and more preferably 1 nm or more and 5 nm or less. When the catalyst has a particle diameter of more than 20 nm, the catalytic activity is reduced, while when the catalyst has a particle diameter of less than 0.5 nm, the catalytic stability is reduced.

As an electron-conducting electric conductor that supports the reaction catalyst according to the embodiment of the invention, carbon particles may be used. Kinds of carbon particles are not limited insofar as they are in the form of microparticles, have electric conductivity, and are not attacked by a catalyst. Carbon black, graphite, activated carbon, carbon fibers, carbon nanotubes, and fullerene can be used. The carbon particle diameter is preferably 10 nm or more and 1000 nm or less, and more preferably 10 nm or more and 100 nm or less. When the carbon particle diameter is less than 10 nm, the gas diffusibility over the air-electrode-side electrode catalyst layer 2 and the fuel-electrode-side catalyst layer 3 is reduced, while when the carbon particle diameter is more than 1000 nm, it makes the formation of an electron conduction path difficult, and the catalytic efficiency is reduced.

The membrane electrode assembly 12 comprising the polyelectrolyte 1 according to the embodiment of the invention is capable of preventing degradation of the polyelectrolyte 1, and ensures high power-generation performance and power-generation stability during long-term operation of a fuel cell, whereby reliability can be improved.

Figure 2:
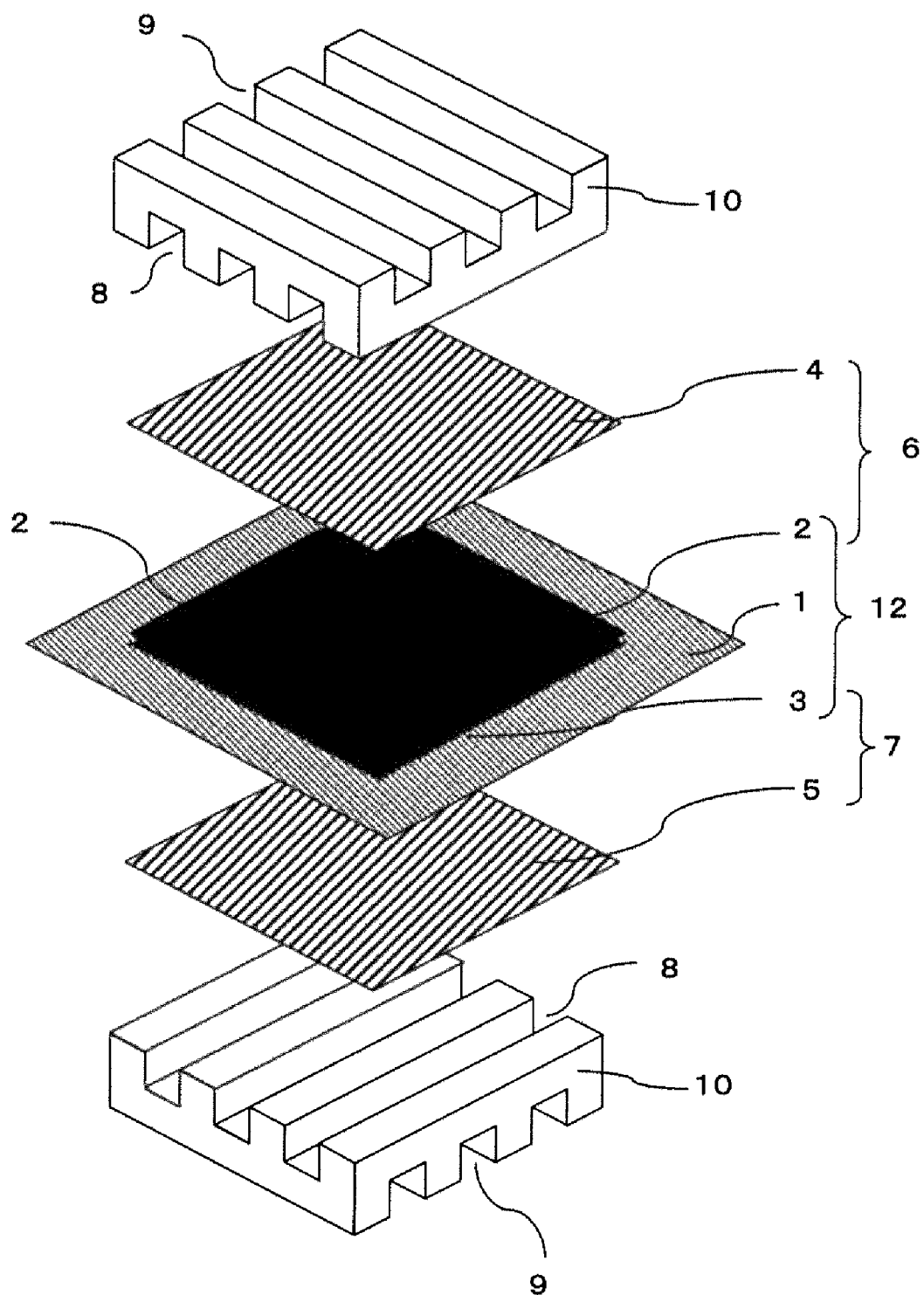
FIG. 2 is a schematic sectional view showing the structure of a single cell of a fuel cell according to one embodiment of the invention.

As shown in FIG. 2, the single cell 11 of the polymer electrolyte fuel cell according to the embodiment of the invention comprises a polyelectrolyte 1, an air-electrode-side electrode catalyst layer 2, a fuel-electrode-side electrode catalyst layer 3, an air-electrode-side gas diffusion layer 4, a fuel-electrode-side gas diffusion layer 5, and a separator 10. The polyelectrolyte 1, the air-electrode-side electrode catalyst layer 2, and the fuel-electrode-side electrode catalyst layer 3 are collectively referred to as a membrane electrode assembly 12 herein. The separator 10 has a gas channel 8 and a cooling water channel 9 therein.

In the single cell 11 of the polymer electrolyte fuel cell according to the embodiment of the invention, the air-electrode-side gas diffusion layer 4 and the fuel-electrode-side gas diffusion layer 5 are disposed so as to face the air-electrode-side electrode catalyst layer 2 and the fuel-electrode-side electrode catalyst layer 3 of the membrane electrode assembly 12, respectively. These diffusion layers are each formed by application of a mixture of carbon black and polytetrafluoroethylene (PTFE) onto a carbon paper. An air electrode 6 and a fuel electrode 7 are thus constituted.

The components are sandwiched between a pair of separators 10 made of an electrically conductive, gas-impermeable material and each provided with a gas channel 8 for circulation of reactant gas in one surface and a cooling water channel 9 for circulation of cooling water in the opposing principle surface, in such a manner that the separators 10 face the air-electrode-side gas diffusion layer 4 and the fuel-electrode-side gas diffusion layer 5, respectively. The single cell 11 is thus constituted. Air, oxygen, or a like oxidizer is fed to the air electrode 6, and a hydrogen-containing fuel gas or an organic fuel is fed to the fuel electrode 7, thereby generating electricity.

A method for producing a membrane electrode assembly 12 according to the embodiment of the invention is explained hereinafter. The method may be as follows. An ink comprising a reaction catalyst, an electric conductor, and a proton-conducting polymer having protonic acid groups is applied onto an air-electrode-side gas diffusion layer 4 and a fuel-electrode-side gas diffusion layer 5 having an electrically conductive porous body or the like for feeding a fuel gas uniformly over an air-electrode-side electrode catalyst layer 2 and a fuel-electrode-side electrode catalyst layer 3, and then dried to form an air-electrode-side electrode catalyst layer 2 and a fuel-electrode-side electrode catalyst layer 3 on the gas diffusion layers 4 and 5, respectively. The air-electrode-side electrode catalyst layer 2 and the fuel-electrode-side electrode catalyst layer 3 are then attached to a polyelectrolyte membrane 1 to sandwich the same, and bonded thereto by thermocompression, thereby giving a membrane electrode assembly 12.

Application of the ink for forming an air-electrode-side electrode catalyst layer 2 and a fuel-electrode-side electrode catalyst layer 3 on an air-electrode-side gas diffusion layer 4 and a fuel-electrode-side gas diffusion layer 5 may be performed by doctor blade coating, screen printing, spraying, etc.

As the method for producing a membrane electrode assembly 12, the following method may be also used. Specifically, an air-electrode-side electrode catalyst layer 2 and a fuel-electrode-side electrode catalyst layer 3 are formed on one side and the other side of a polyelectrolyte membrane 1, respectively, by transcription or spraying, and the resulting laminate is then sandwiched between an air-electrode-side gas diffusion layer 4 and a fuel-electrode-side gas diffusion layer 5.

The single cell 11 of the polymer electrolyte fuel cell according to the embodiment of the invention is capable of preventing degradation of the polyelectrolyte 1, and further ensures high power-generation performance and power-generation stability during long-term operation of a fuel cell, whereby reliability can be improved.

Example 1

Hereinafter, the invention is explained in further detail by means of examples, but the scope of the invention is not limited thereto.

Polyelectrolytes 1 produced in Example 1, Comparative Example 1, and Comparative Example 2 were evaluated using the following methods.

Hydrogen Ion Exchange Capacity

A proton-conducting resin was dissolved in N,N-dimethylformamide, and titrated with 0.1 M aqueous sodium hydroxide solution. The molar number of the sulfonic groups was determined from the point of neutralization.

Fenton's Test

A dried sample is immersed in a Fenton solution (3% aqueous hydrogen peroxide solution, 4 ppm $Fe^{2+}$, 60° C.) for 3 hours. The sample is then removed, washed with an aqueous hydrochloric acid solution and with water, dried, and then weighed. From the change in weight before and after immersion in the Fenton solution, durability was evaluated. Weight change (%)={(weight of sample before testing)−(weight of sample after testing)}/(weight of sample before testing)

A 1-g quantity of sulfonated polyether ether ketone (hereinafter referred to as "sulfonated PEEK") manufactured by VICTREX under the trade name of "450PF" and 0.05 g of a radical-quenching material 2,6-di-tert-butyl-4-hydroxymethylphenol manufactured by TOKYO CHEMICAL INDUSTRY were mixed in a mixed solvent of water and isopropyl alcohol.

Subsequently, the prepared solution was applied onto a polyimide substrate by casting, and the solvent was dried. The obtained membrane was then hot-pressed to promote reaction, thereby giving a proton-conducting polyelectrolyte 1.

The hot press was performed under conditions of a pressing temperature of 120° C., a pressing time of 3 hours, and a pressing force of 60 kgf/cm². The hydrogen ion exchange capacity of the obtained proton-conducting polyelectrolyte 1 was 1.9 meq/g.

Comparative Example 1

A proton-conducting polyelectrolyte 1 was produced by the same method as in Example 1, except that a radical-quenching material was not used. The obtained polyelectrolyte 1 was subjected to Fenton's test. However, the polyelectrolyte 1 after the test was brittle and could not be collected.

Comparative Example 2

A proton-conducting polyelectrolyte 1 was produced by the same method as in Example 1, except that a phenolic antioxidant manufactured by CIBA SPECIALTY CHEMICALS under the trade name of "IRGANOX1330" was used as a radical-quenching material.

TABLE 1

| | Hydrogen ion exchange capacity (Before reaction) | Hydrogen ion exchange capacity (After reaction) | Fenton's test (Weight change) |
| --- | --- | --- | --- |
| Example 1 | 2.0 mmol/g | 1.9 mmol/g | −11% |
| Comp. Ex. 1 | 2.0 mmol/g | — | — |
| Comp. Ex. 2 | 2.0 mmol/g | — | −58% |

As compared with Comparative Example 2, the change in weight after Fenton's test is smaller in Example 1, which indicates superior durability of the product of Example 1. As above, when a proton-conducting polymer and a radical-quenching material having a radical-scavenging capability are chemically bonded, the radical-quenching material is prevented from eluting from the electrolyte and can exhibit the radical-quenching effects.

In Example 1, the hydrogen ion exchange capacity does not change before and after the reaction. This indicates that the chemical bond of the radical-quenching material was formed via moieties other than protonic acid groups. This shows that even when a radical-quenching material is chemically bonded to a proton-conducting polymer, proton conductivity is not reduced, and high proton conductivity can be achieved.

The invention is a polyelectrolyte 1 obtainable by chemically bonding a proton-conducting polymer to a radical-quenching material having a radical-scavenging capability via moieties other than protonic acid groups. According to the invention, elution of the radical-quenching material from the polyelectrolyte 1 is suppressed, whereby the durability is improved, and because the chemical bond is formed at moieties other than protonic acid groups, high proton conductivity can be maintained. Accordingly, an ion exchange membrane, a solid electrolyte membrane, a membrane electrode assembly, and a fuel cell having proton conductivity and durability (acid resistance, oxidation resistance, heat resistance, OH radical resistance) can be produced.

What is claimed is:

1. A polyelectrolyte which is obtained by creating a chemical bond between a proton-conducting polymer; and a radical-quenching material, the proton-conductive polymer having protonic acid groups, the radical-quenching material having at least one methylol groups in the molecule and radical-scavenging capability, and the chemical bond between the proton-conducting polymer and the radical-quenching material being created through one of the methylol groups in the radical-quenching material and moieties other than the protonic acid groups in the proton-conducting polymer.

2. The polyelectrolyte according to claim 1, wherein the proton-conducting polymer is an aromatic polymer.

3. The polyelectrolyte according to claim 1, wherein the proton-conducting polymer is polyether ketone or polyether ether ketone.

4. The polyelectrolyte according to claim 1, wherein the proton-conducting polymer is phenol resin.

5. The polyelectrolyte according to claim 1, wherein the proton-conducting polymer has sulfonic acid groups.

6. The polyelectrolyte according to claim 1, wherein the proton-conducting polymer has a hydrogen ion exchange capacity of 0.5 meq/g or more and 10 meq/g or less.

7. The polyelectrolyte according to claim 1, wherein the chemical bond between the proton-conducting polymer and the radical-quenching material is formed by heating.

8. The polyelectrolyte according to claim 1, wherein the heating is performed at a temperature of 60° C. or more and 250° C. or less.

9. A membrane electrode assembly comprising the polyelectrolyte of claim 1.

10. A fuel cell comprising the polyelectrolyte of claim 1.

11. A polyelectrolyte represented by the following chemical formula:

[Chemical Formula 1]

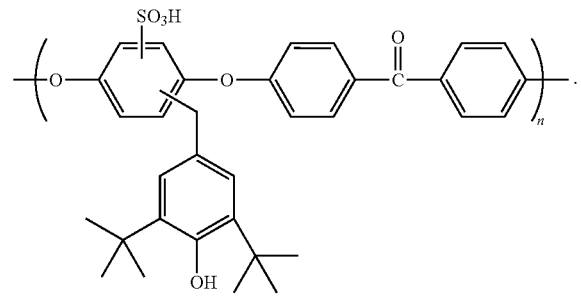

12. A method for producing a polyelectrolyte, comprising: providing a proton-conducting polymer having protonic acid groups, and chemically bonding the proton-conducting polymer to a radical-quenching material having a radical-scavenging capability via moieties other than the protonic acid groups, wherein the radical-quenching material has at least one methylol groups in the molecule, and wherein the radical-quenching material is chemically bonded to the proton-conductive polymer through one of the methylol groups.

13. The method for producing a polyelectrolyte according to claim 12, wherein the proton-conducting polymer is an aromatic polymer.

14. The method for producing a polyelectrolyte according to claim 12, wherein the proton-conducting polymer is polyether ketone or polyether ether ketone.

15. The method for producing a polyelectrolyte according to claim 12, wherein the proton-conducting polymer is phenol resin.

16. The method for producing a polyelectrolyte according to claim 12, wherein the proton-conducting polymer has a hydrogen ion exchange capacity of 0.5 meq/g or more and 10 meq/g or less.

17. The method for producing a polyelectrolyte according to claim 12, wherein the proton-conducting polymer has the following chemical formula:

[Chemical Formula 2]

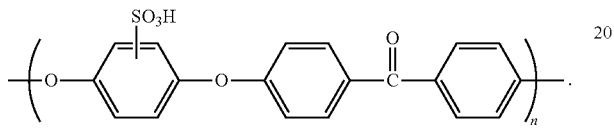

18. The method for producing a polyelectrolyte according to claim 12, wherein the radical-quenching material is represented by the following formula:

[Chemical Formula 3]

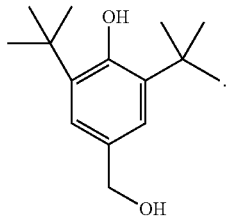

* * * * *